Feb. 27, 1968 J. R. VANDE WEGE 3,371,282

PLURAL, MODIFIED RING COUNTERS WHEREIN EACH SUCCEEDING COUNTER ADVANCES ONE STAGE UPON COMPLETION OF ONE CYCLE OF PRECEDING COUNTER

Filed Oct. 5, 1965 3 Sheets-Sheet 1

INVENTOR
JOHN R. VANDE WEGE
BY
C. A. Gulbrandsen
ATTY.

Feb. 27, 1968 J. R. VANDE WEGE 3,371,282

PLURAL, MODIFIED RING COUNTERS WHEREIN EACH SUCCEEDING COUNTER ADVANCES ONE STAGE UPON COMPLETION OF ONE CYCLE OF PRECEDING COUNTER

Filed Oct. 5, 1965 3 Sheets-Sheet 2

Feb. 27, 1968 J. R. VANDE WEGE 3,371,282

PLURAL, MODIFIED RING COUNTERS WHEREIN EACH SUCCEEDING COUNTER ADVANCES ONE STAGE UPON COMPLETION OF ONE CYCLE OF PRECEDING COUNTER

Filed Oct. 5, 1965

3 Sheets-Sheet 3

United States Patent Office 3,371,282
Patented Feb. 27, 1968

3,371,282

PLURAL, MODIFIED RING COUNTERS WHEREIN EACH SUCCEEDING COUNTER ADVANCES ONE STAGE UPON COMPLETION OF ONE CYCLE OF PRECEDING COUNTER

John R. Vande Wege, Glen Ellyn, Ill., assignor to Automatic Electric Laboratories, Inc., Northlake, Ill., a corporation of Delaware Filed Oct. 5, 1965, Ser. No. 493,131
8 Claims. (Cl. 328—43)

ABSTRACT OF THE DISCLOSURE

A plurality of re-entrant flip-flop counters driven by a clock providing two interlaced pulse trains are interconnected so that as the first counter cycles from its last count the second counter is caused to advance one count, etc. One clock pulse train supplies the principal shift pulses for the counters. The first counter is arranged to be advanced from its next-to-last step to its last step responsive to a pulse from the other clock pulse train, these last two steps being combined by the decoding logic to constitute a single count. The output from the last step of the first counter is used to control the supply of shift pulses to the other counters so that all counters advance simultaneously as the first counter recycles from its last step to its first step.

Figure 1:
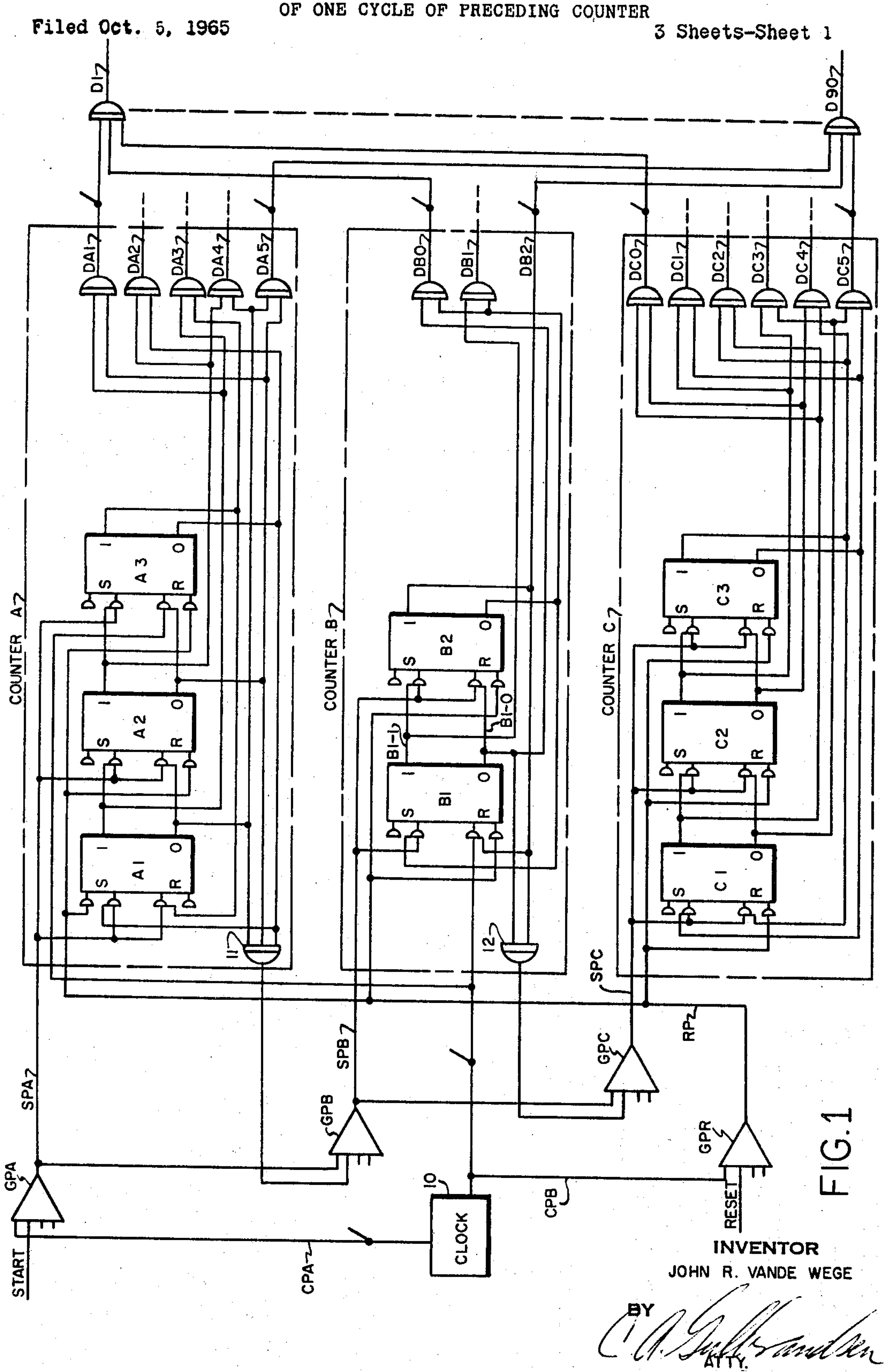

This invention relates to a counting arrangement, and more particularly to a multi-stage counting arrangement wherein each stage is a cyclic counter comprising a plurality of bistable devices connected in a re-entrant manner such that as the counter is stepped the state of each device is changed in accordance with the state of the preceding device.

A re-entrant counter can be a simple ring counter in which one of the bistable devices is in a unique state compared to the others, and this unique state which can be designated the "one" or true state is advanced around the ring as input pulses are supplied to all of the devices to step the counter. A modified form of the ring counter reduces the number of bistable devices for a given count to one half simply by connecting the output of the last device to the input of the first device so that the state is inverted. With this arrangement, on the first step of the counter the first device is set to "one," after the second step the first two devices are set to "one," and so on until all of the devices are set to "one," and then on succeeding steps the first device is reset to the "zero" state and so on progressively until all of the devices are reset. This arrangement requires decoding output logic in which each output gate has two inputs to detect the state of the device which has just changed state and the following one in the ring.

A ring counter or modified ring counter has many advantages over other counters such as simple binary counters, some of these advantages being simplified counting and decoding logic, and the fact that an error in the counter does not cause an indeterminate jump in the count but causes the counter to stop at some point in the normal sequence.

However it is not practical to provide a very large number of counting steps in a single re-entrant counter, and therefore a plurality of these counters must be connected in stages, each stage being advanced one step in response to the completion of one cycle of the preceding stage. Various arrangements are possible for coupling two stages which either require a large amount of logic circuits, or cause the stages to advance at different times.

An object of this invention is to provide an arrangement for advancing a stage of a counter simultaneously with the advance of a preceding stage in recycling, using a minimum of logic circuits for coupling the stages.

The invention is preferably incorporated in a system having as standard building blocks flip-flops having set and reset input circuits which are actuated by a pulse appearing at an AC input provided a signal is present on a DC input at the same input circuit; gated pulse amplifiers in which a pulse appearing at an AC input is amplified and reshaped provided direct current control signals are present at one or more other inputs thereof; and logic gating circuits. The flip-flop input circuits are designed with an inherent delay such that a direct current input signal applied after the beginning of a pulse is ineffective for the standard duration of the pulse. However the gated pulse amplifiers are sufficiently fast in operation to produce an output pulse even though the DC input is only applied after the beginning of the pulse input signal. The system also includes a clock circuit which supplies the pulses for the flip-flops and gated pulse amplifiers. This clock has two output leads with respective trains of pulses thereon, the pulses on each lead being intermediate to those on the other lead, with the repetition rate being the same.

It is a subsidiary object of the invention to provide a counting arrangement capable of a high count in which the output of the counter for each step of the count is available for the full duration equal to the interval of one of the clock pulse trains.

According to the invention a counting arrangement is provided comprising a plurality of re-entrant counters, in which each counter comprises a plurality of bistable devices such as flip-flops, each counter being provided with shift pulses to advance it step by step, the shift pulses for the first counter being gated directly from one of the output leads of the clock, and the shift pulses for the succeeding counters each being gated from the shift pulses of the preceding counter each time the preceding counter completes a cycle; with at least one of the counters arranged to advance one of its steps on a pulse from the other clock lead occurring during the intermediate interval so that two adjacent steps comprise one output count, and the output of the step so advanced by the intermediate pulse is used to gate the shift pulse to the succeeding counter. With this arrangement the succeeding counter is advanced simultaneous with the advance of the one counter upon starting a new cycle, and cannot be advanced prematurely.

Figure 2:
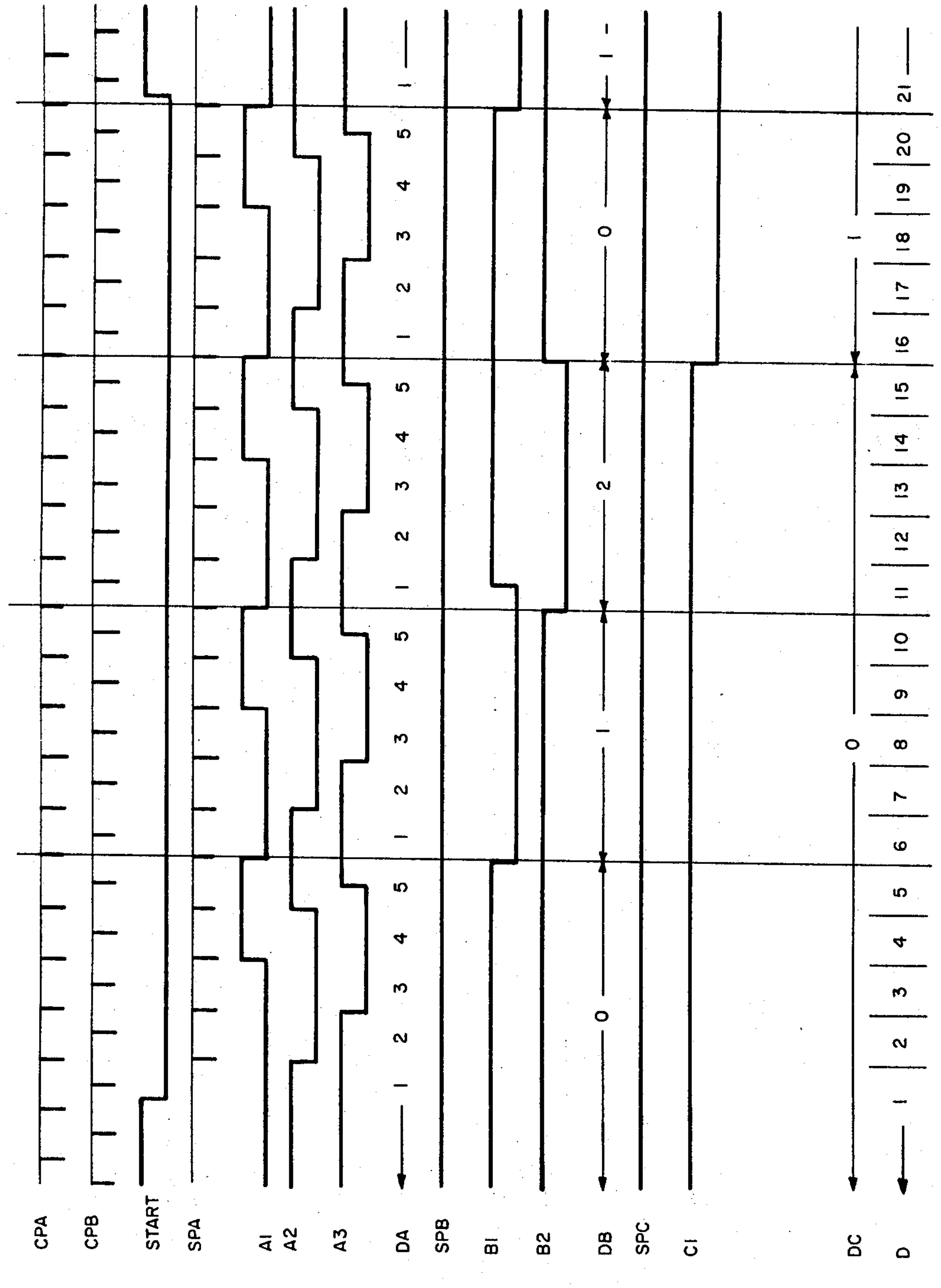
Figure 3:
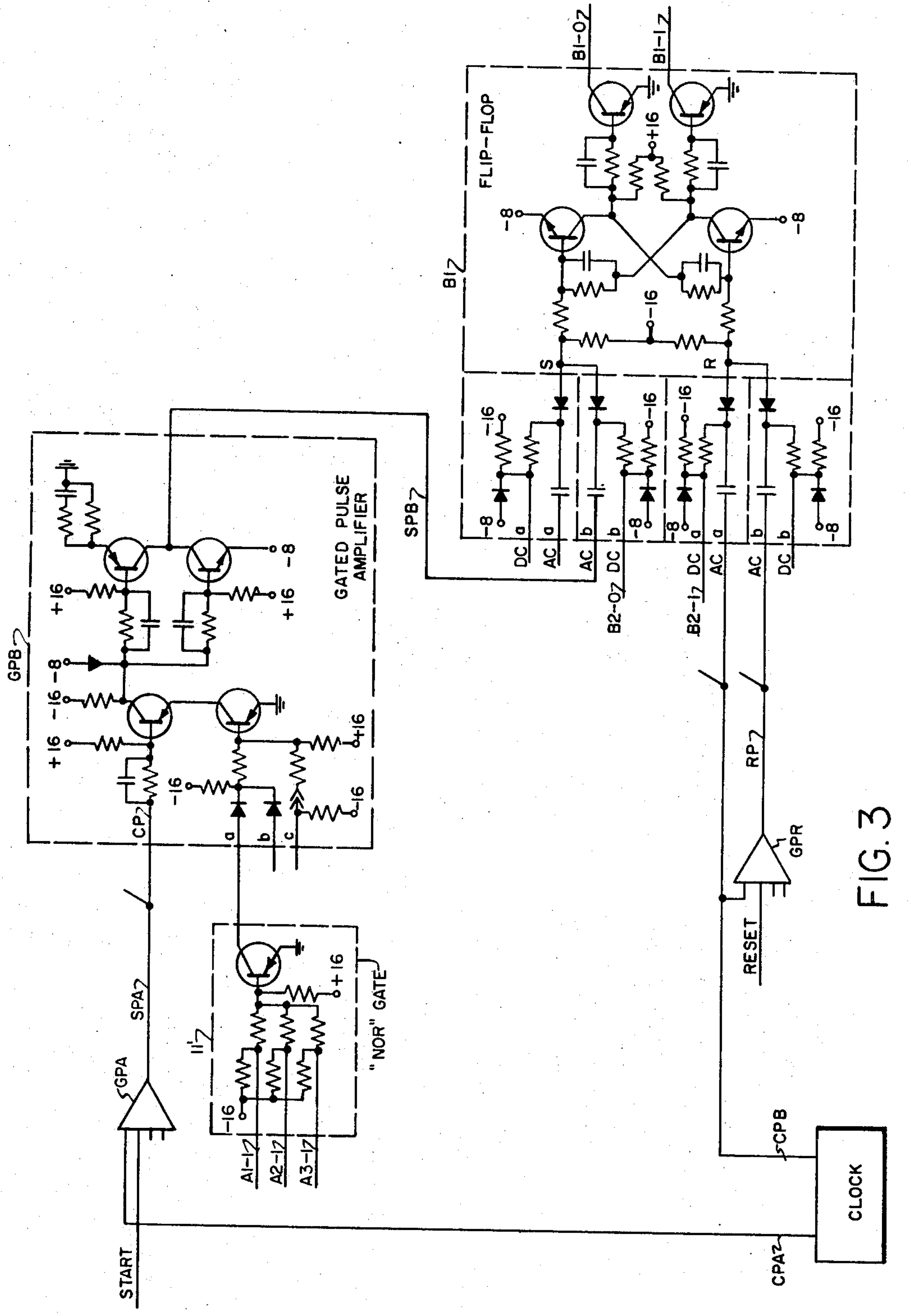

The above-mentioned and other objects and features of this invention and the manner of attaining them will become more apparent and the invention itself will be best understood, by reference to the following description of an embodiment of the invention taken in connection with the accompanying drawings comprising FIGS. 1 to 3 wherein:

FIG. 1 is a functional block diagram of a multistage counter according to the invention;

FIG. 2 comprises timing graphs showing the operation of the counting arrangement of FIG. 1; and FIG. 3 is a schematic diagram of a portion of the counting arrangement showing the typical building blocks used therein.

Referring to FIG. 1, it has been chosen to illustrate the invention as embodied in a counting arrangement comprising three counters. The first counter A comprises three flip-flops A1, A2 and A3; the second counter B comprises two flip-flops B1 and B2; and the third counter C comprises three flip-flops C1, C2 and C3. Shifting or advancing pulses for the counters are supplied on leads SPA, SPB and SPC respectively via gated pulse amplifiers GPA, GPB and GPC. In addition reset pulses on lead RP are supplied via a gated pulse amplifier GPR.

All of the flip-flops are identical, and one of them, B1, is shown in schematic form in FIG. 3. Each flip-flop is a bistable circuit configuration comprising transistors. Each is provided with four coincidence gates for inputs, either one of the upper two being used to set the flip-flop, and either one of the lower two being used to reset the flip-flop. Each coincidence gate has an AC input via a capacitor and a DC input via a resistor. Each DC input has a negative biasing potential arrangement. The two upper coincidence gates are connected through respective diodes forming an OR gate to the set input of the flip-flop. The two lower coincidence gates are connected through respective diodes to the reset input of the flip-flop. With the biasing arrangement as shown, unused inputs may be left open circuited. Each input coincidence gate of a flip-flop is arranged with a priming time so that the DC input must be present for this period of time before the AC input will be effective. This priming time along with the switching and transmission delays in the circuits provides an arrangement in which a change of state of a flip-flop produced by AC input pulse is not effective at the DC input of the same or other flip-flops to produce another change of state during the same pulse, but is effective upon receipt of the next pulse. The four coincidence gates are represented in FIG. 1 as four small gates to the left of the flip-flop with the AC input shown on the left at the center of the gate, and the DC input shown at one side thereof.

Gated pulse amplifiers are transistor circuits having a direct coupled gating input arrangement and a capacitively coupled trigger pulse input terminal. One gated pulse amplifier, GPB, is shown in schematic form in FIG. 3. The direct coupled gating is controlled via three input terminals coupled to the base electrode of one transistor, and is effective when the first two of these inputs *a* and *b* are true in coincidence, or the other input *c* is true. The AC input designated CP is coupled via the capacitor and resistor in parallel to the base electrode of another transistor. Thus each gated pulse amplifier has four inputs which are always shown such that the upper input is the pulse input, the next two inputs are the direct coupled coincidence inputs, and the last is a single direct coupled input. The two coincidence inputs *a* and *b* are so arranged that an open circuit is equivalent to a true signal, and the single input *c* is arranged so that if it is not used it does not have any effect on the operation of the amplifier. All of the gated pulse amplifiers shown in FIG. 1 have only the upper direct current input *a* used, so that whenever the signal at this input is true a pulse appearing at the AC input at the top will cause an output pulse to be generated.

Except for the clock pulses used for triggering at the AC inputs of the flip-flops and gated pulse amplifiers, the circuits are direct coupled, that is, signals are represented by steady-state voltages. Two levels are employed. The first level is usually −8 volts, although other negative values may be used, and represents the binary one, true, on or active condition. The second level, ground potential, represents the binary zero, false, off or inactive condition. The flip-flops and gate circuits are arranged such that the negative bias potential is provided at the input terminals of the gates and the DC inputs of the flip-flop, and this serves as the bias potential for the outputs of the preceding circuits. For the false condition, the flip-flops and gates provide a low resistance path to ground via a saturated transistor, and this ground potential is thereby applied at the inputs of the succeeding circuits.

The logical operations may be expressed with Boolean algebra. In this notation the addition symbol signifies OR, the multiplication symbol, expressed or implied, signifies AND, and overlining signifies the inverted condition.

The clock 10 is a pulse generator supplying trains of negative pulses on two output leads CPA and CPB. The pulses on each lead have a duration of about two microseconds, and recur every forty microseconds. The pulses on lead CPB are intermediate those on lead CPA, with the beginning of each CPB pulse occurring about twenty microseconds after the beginning of a CPA pulse. These pulses are shown by the two graphs at the top of FIG. 2, with each pulse represented by a short vertical line. The pulses on these output leads are supplied via gated pulse amplifiers to a large number of flip-flops used for storage of logical conditions, counting, etc., which are interconnected by various logic circuits, the clock pulses being used to provide sequential control of the logic operations in a system. FIG. 1 shows only one portion of such a system. Thus it is seen that the clock 10 is common to many sequentially synchronized circuits.

As shown in FIG. 1 the pulses on lead CPA are supplied to the AC input of the gated pulse amplifier GPA. A negative signal appears on lead START when the counting arrangement is to be activated, and enables the amplifier GPA to gate the "A" clock pulses through to the shift or advance control lead SPA as shown by the graphs START and SPA in FIG. 2. Whenever the negative output signal is obtained from gate 11 the gated pulse amplifier GPB is enabled to gate a pulse from lead SPA to SPB, as shown by graph SPB in FIG. 2. Likewise when a negative signal is received from gate 12 the gated pulse amplifier GPC is enabled to gate a pulse from lead SPB to lead SPC, as shown by the graph SPC of FIG. 2. When the signal on lead START returns to ground potential the gated pulse amplifier GPA is disabled to thereby stop the entire counting arrangement, with the count being retained registered therein. The counting arrangement may subsequently be reset to count one by a negative signal on lead RESET which enables the gated pulse amplifier GPR to gate a pulse from lead CPB to lead RP.

Counter C represents the usual arrangement of a modified ring counter providing a number of counting steps equal to twice the number of flip-flops, in this case six counting steps for three flip-flops. In this case the shifting pulse conductor SPC is connected to the AC inputs of the inner set and reset coincidence gates of all of the flip-flops, so that they all receive every pulse for advancing the counter. Each flip-flop except the last has its one and zero outputs connected respectively to the set and reset inner coincidence gates at their DC inputs. In the reentrant connection from the outputs of the last flip-flop C3 to the first flip-flop C1 the one output is connected to the reset coincidence gate and the zero output is connected to the set coincidence gate at their DC inputs. With this arrangement, if the three flip-flops are all initially in the reset condition, the first pulse will cause the flip-flop C1 to tbe set while C2 and C3 remain reset, the second pulse will cause flip-flop C2 to be set while C1 remains set and C3 remains reset, the third pulse will cause flip-flop C3 to be set while flip-flops C1 and C2 remain set, the fourth pulse will cause flip-flop C1 to be reset while flip-flops C2 and C3 remain set, the fifth pulse will cause flip-flop C2 to be reset while flip-flop C1 remains reset and C3 remains set, and the sixth pulse will cause flip-flop C3 to be reset while flip-flops C1 and C2 remain reset, thus completing the cycling of the counter to zero. It is apparent that with this arrangement each count may be decoded by a gate having an input from the flip-flop which has just changed state and the succeeding flip-flop in the ring. Thus, FIG. 1 shows six decoding gates to supply the output signals DC0 to DC5 inclusive. The counting steps and the states of the flip-flops are shown in Table 1.

TABLE 1

| DC | C1 | C2 | C3 |
|---|---|---|---|
| 0 | 0 | 0 | 0 |
| 1 | 1 | 0 | 0 |
| 2 | 1 | 1 | 0 |
| 3 | 1 | 1 | 1 |
| 4 | 0 | 1 | 1 |
| 5 | 0 | 0 | 1 |
| 0 | 0 | 0 | 0 |

Note that the modified ring counter arrangement results in a number of steps in the permitted regular counting sequence equal to twice the number of flip-flops. With a counter comprising three flip-flops the total possible number of combinational states is eight, and six of these are permitted states in the normal counting sequence. If by error the counter is in one of the two unpermitted states, it could easily be reset to one of the permitted states by providing suitable logic circuits, the input condition for such logic for example for counter C being $(C1\overline{C2}C3+\overline{C1}C2\overline{C3})$. This ease of resetting upon error is not true for a counter having four or more flip-flops. Therefore, it is desirable to standardize on counters having two or three flip-flops, and to provide a multistage counting arrangement comprising a plurality of these counters for higher counts. Each counter should be advanced one step upon the start of a new cycle of the preceding counter. There are a number of possible arrangements for coupling the counters to obtain this result. One arrangement would be to provide logic circuits from the first counter to supply the DC control to gate the gated pulse amplifier which supplies the AC advance pulses to the second counter. In a similar way the gated pulse amplifier supplying pulses to the third counter could be gated by logic circuits from the first and second counters, etc. Besides the apparent disadvantage of a large amount of logic circuits for gating the gated pulse amplifier of the last stage, there is another difficulty which makes this arrangement useless. The gated pulse amplifiers are fast enough so that a pulse which advances one counter produces a change of state therein which makes the gated pulse amplifier for the next stage operative to supply a pulse to its counter and cause it to advance. Proper operation would be for the next clock pulse to advance the second counter, and this also happens, thus causing the second counter to be advanced twice instead of once. It is possible to get around this difficulty by gating the coincidence gates at the inputs of all of the flip-flops of the second counter instead of the gated pulse amplifier, since the DC input of the coincidence gates at the flip-flops have an inherent delay of sufficient duration to cover the pulse width. However such an arrangement negates the advantage of a ring counter or modified ring counter of having simplified counter and decode logic.

Another possible arrangement would be to use pulses derived from lead CPA for driving the first counter and pulses derived from lead CPB for driving the second counter. The disadvantages of this are that only two counters can be accommodated in a counting arrangement and the count is not entirely sequential. It is desirable that each step of the decoded outputs of the overall counting arrangement have a duration equal to the interval between pulses on one of the clock output leads, which is not the case unless the advance of a counter occurs simultaneously with the advance of the preceding counters on the same clock pulse.

According to the invention, at least one of the counters, preferably the first, having the regular DC connections from the output of each flip-flop to the input of the next as described for counter C, has one of its steps advanced by a "B" pulse, while the remaining steps are advanced by "A" pulses in the regular manner. The result (with the pulse interval for each train of pulses being forty microseconds) is that for the counter having three flip-flops there are four steps of forty microseconds duration and two steps of twenty microseconds duration. For counter purposes these two twenty-microsecond steps are decoded as one count giving five counts of forty microsecond duration. To advance the following counter, the twenty microsecond sixth step of the first counter is decoded and used to gate the gated pulse amplifier for the next counter. Since the sixth step becomes true during a "B" pulse it is true during only one "A" pulse, the one which follows in sequence, and the next counter can be advanced on an "A" pulse without requiring any additional logic gating aside from the counter flip-flops. With the second counter gated pulse amplifier fed from the first counter gated pulse amplifier, no additional control logic is needed for the second counter gated pulse amplifier. Note that the count is sequential and continuous with no gaps or extra counts.

Specifically, counter A has the same DC connections between flip-flops as counter C, and the shifting or advancing pulses are "A" pulses supplied from gated pulse amplifier GPA to lead SPA and thence to the inner set and reset coincidence gates of each of the flip-flops A1 and A2, and to the inner set coincidence gate of flip-flop A3. The inner reset coincidence gate AC input of flip-flop A3 is connected directly to the clock lead CPB. This results in a counter in which the first four steps are the same as the corresponding four steps in counter C and are decoded by gates to the outputs DA1 to DA4 inclusive. For the fifth and sixth steps the flip-flops A1 and A2 are in the reset condition and flip-flop A3 is in the set condition for twenty microseconds and then in the reset condition for twenty microseconds, so that these steps can be combined and decoded by a gate recognizing coincidence of flip-flops A1 and A2 in the reset condition to provide the output DA5. The conditions of the flip-flops of the five steps are shown in Table 2.

TABLE 2

| DA | A1 | A2 | A3 |
|---|---|---|---|
| 1 | 1 | 0 | 0 |
| 2 | 1 | 1 | 0 |
| 3 | 1 | 1 | 1 |
| 4 | 0 | 1 | 1 |
| 5 | 0 | 0 | 1+0 |
| 1 | 1 | 0 | 0 |

The sixth step in which all three flip-flops are in the reset condition is decoded by gate 11 and used as the DC control for gated pulse amplifier GPB. Note that the decode logic equation $(\overline{A1}\;\overline{A2}\;\overline{A3})$ is shown implemented in FIG. 1 by an AND gate 11, while FIG. 3 shows a resistor-transistor NOR gate 11′ which requires as inputs the inverse of those in the equation. The AC pulse input for gated pulse amplifier GPB is supplied from lead SPA at the output of the first-counter gated pulse amplifier GPA. The output of gated pulse amplifier GPB on lead SPB provides the advancing pulses for counter B. Since the regular modified ring counter always provides an even count it can be designated as having an even count mode, and the arrangement with two steps combined as one count can be designated as having an odd count mode. To obtain many of the advantages of the invention it is only necessary that the first counter of a multistage counting arrangement be designed in accordance with the odd count mode. The other counters can have either the even count mode or the odd count mode in accordance with the requirements of the particular design. It has been chosen to show the second counter B as a two flip-flop counter in the odd count mode providing three counts. Therefore the DC connections comprise the outputs of flip-flop B1 connected to the corresponding DC inputs of the inner coincidence gates of flip-flop B2, and of the outputs of flip-flop B2 connected to the opposite inputs of the inner coincidence gates of flip-flop B1. The AC advance pulse inputs to the set coincidence gate of flip-flop B1 and both the set and reset coincidence gates of B2 are supplied from lead SPB. As already noted these pulses are derived from the clock output lead CPA via the gated pulse amplifiers GPA and GPB, and therefore are "A" pulses. The AC input for the inner reset coincidence gate of flip-flop B1 is connected directly to the clock lead CPB, and is thus a "B" pulse. The resulting states of the two flip-flops for each count are shown in Table 3.

TABLE 3

| DB | B1 | B2 |
|---|---|---|
| 0 | 0 | 0 |
| 1 | 1 | 0 |
| 2 | 1+0 | 1 |
| 0 | 0 | 0 |

The decoded outputs DB0 and DB1 are provided via gates with inputs from the two flip-flops in accordance with the Table 3. The decoded output DB2 is two steps combined and as shown by the table is simply the one output of flip-flop B2. The second step of count two, in which flip-flop B1 is in the reset condition and flip-flop B2 is in the set condition, is decoded by gate 12 and supplied as the DC control input of gated pulse amplifier GPC. The AC pulse input of gated pulse amplifier GPC is taken from lead SPB at the output of gated pulse amplifier GPB. This supplies the advance pulses on lead SPC for counter C as already noted.

The decoded outputs of the three counters are further decoded via ninety gates to provide the overall decoded outputs D1 to D90 inclusive. The decoding formula provides a weight of one for the outputs of counter A, a weight of five for the outputs of counter B and a weight of fifteen for the outputs of counter C.

The graphs of FIG. 2 show how all of the advance pulses on leads SPA, SPB and SPC are "A" pulses appearing simultaneously with the clock pulses on lead CPA (except for some slight delay which is small compared to the twenty microsecond interval in the gated pulse amplifiers). The graphs showing the conditions of the flip-flops show how they change state on "A" pulses, with the exception of resetting flip-flop A3 on a "B" pulse, and the resetting of flip-flop B1 on a "B" pulse, in accordance with the odd count mode of the invention. Note in all of these graphs that the negative level represents the true or one output, and the ground level represents the false or zero output. The graphs also indicate the decoded values DA, DB and DC and the overall decoded value D. The graphs for flip-flops C2 and C3 have been omitted since they remain in the reset state for the entire duration of the twenty-one steps shown in the graph. The graph shows the counter stopped at step twenty-one.

In some system applications the counting arrangement would always be cycled through its complete count, while in others it is desirable to reset to a given count such as zero or one. FIG. 1 shows an arrangement for resetting the counting arrangement to one using pulses from lead CPB via a gated pulse amplifier GPR which is controlled by a signal on lead RESET to supply a reset pulse on lead RP. This pulse is applied to the upper set input of flip-flop A1 and to the lower reset inputs of all of the other flip-flops, to thereby set counter A to one and the counters B and C to zero. This is the state shown on the graphs of FIG. 2 at the left hand side before the signal START has become true.

While I have described above the principles of my invention in connection with specific apparatus, it is to be clearly understood that this description is made only by way of example and not as a limitation to the scope of my invention.

What is claimed is:

1. A counting arrangement comprising a plurality of re-entrant counters, each counter comprising a plurality of bistable devices, each counter having recurring cycles with a determined number of steps per cycle, a source of shift pulses connected to the bistable devices to advance the counter one step per pulse;

coupling means between said counter to supply shift pulses and thereby advance each counter, other than the first, one step for each cycle of the preceding counter;

at least one of said counters being connected to a source of pulses which occur intermediate in time with respect to the shift pulses for that counter to advance the counter to a predetermined one of its steps in response to coincidence of the counter being at its preceding step and the occurrence of one of said intermediate pulses; said coupling means between said one counter and the succeeding counter being a pulse gate having a pulse input connected to the source of shift pulses for said one counter, and a control input connected to be enabled in response to said one counter being in said predetermined one of its steps, the pulse gate being arranged to supply an output pulse upon each occurrence of an input pulse in coincidence with its control input, the shift pulses for said succeeding counter being the output of said pulse gate;

whereby said succeeding counter is only advanced one step simultaneous with said one counter advancing from said predetermined one of its steps to its following step.

2. A counting arrangement as claimed in claim 1, wherein each of said bistable devices is a flip-flop comprising two amplifying devices with the output of each amplifying device coupled to the input of the other.

3. A counting arrangement as claimed in claim 2, wherein said predetermined one of its steps and the preceding step are decoded as a single output count of said one counter.

4. A counting arrangement as claimed in claim 2, wherein said one counter is the first counter, said coupling means are gated pulse amplifiers having a pulse input and a direct coupled control input; a pulse generator having two output conductors to produce trains of pulses having the same pulse intervals on the respective conductors, one of said generator output conductors being connected to the pulse input of the gated pulse amplifier associated with the first counter, and the other generator output conductor being the source of said intermediate pulses; the output of each gated pulse amplifier being the source of shift pulses for its associated counter, the output of each gated pulse amplifier other than the last being coupled to the pulse input connection of the gated pulse amplifier associated with the succeeding counter.

5. A counting arrangement as claimed in claim 4, wherein each of said bistable devices includes at least two input coincidence gates for set and reset of the device respectively, each coincidence gate having a capacitance coupled pulse input and a direct coupled control input, said connections of the bistable devices to the sources of shift pulses or intermediate pulses being via said pulse inputs of said coincidence gates.

6. A counting arrangement as claimed in claim 5 wherein each of said bistable devices has two output conductors for the set and reset conditions respectively, wherein each counter has the output conductors of the last bistable device connected to the opposite coincidence gate control inputs of the first bistable device, and each of the other bistable devices has its output conductors connected to the corresponding coincidence gate control inputs of the succeeding bistable device, whereby as each counter is advanced a step the state of each bistable device is transferred to the succeeding bistable device, except that the state of the last bistable is inverted as it is transferred to the first bistable device, so that each counter has twice as many steps as it has bistable devices.

7. A counting arrangement as claimed in claim 6, wherein said connection of said one counter to a source of intermediate pulses comprises a connection of the pulse input of one of the coincidence gates of one of the bistable devices to said source of intermediate pulses.

8. A counting arrangement as claimed in claim 7, wherein said predetermined one of its steps and the preceding step of said one counter are decoded as one output count of said one counter, the other steps of said one counter are each decoded as one output count, and said predetermined one of its steps is decoded to supply the control input signal to the gated pulse amplifier of said succeeding counter.

No references cited.

ARTHUR GAUSS, *Primary Examiner.*

S. D. MILLER, *Assistant Examiner.*